US012627722B2

(12) United States Patent
Landgraf et al.

(10) Patent No.: US 12,627,722 B2
(45) Date of Patent: May 12, 2026

(54) MULTI-VIEWER EXTENDED REALITY REPROJECTION

(71) Applicant: Holo-Light GmbH, Innsbruck (AT)

(72) Inventors: Philipp Landgraf, Altenmarkt a.d. Alz (DE); Alexander Werlberger, Haimhausen (DE)

(73) Assignee: Holo-Light GmbH, Innsbruck (AT)

( * ) Notice: Subject to any disclaimer, the term of this patent is extended or adjusted under 35 U.S.C. 154(b) by 205 days.

(21) Appl. No.: 18/481,712

(22) Filed: Oct. 5, 2023

(65) Prior Publication Data

US 2024/0129350 A1 Apr. 18, 2024

(30) Foreign Application Priority Data

Oct. 12, 2022 (EP) ..................................... 22201143

(51) Int. Cl.
*H04L 65/60* (2022.01)
*G01S 5/02* (2010.01)
*G06T 19/00* (2011.01)

(52) U.S. Cl.
CPC ............ *H04L 65/60* (2013.01); *G01S 5/0284* (2013.01); *G06T 19/006* (2013.01)

(58) Field of Classification Search
None
See application file for complete search history.

(56) References Cited

U.S. PATENT DOCUMENTS

| | | | | | |
|---|---|---|---|---|---|
| 11,706,266 | B1 * | 7/2023 | Bajaj | ....................... | G06F 3/016 |
| | | | | | 709/204 |
| 12,211,005 | B2 * | 1/2025 | Lebaredian | ........... | G06T 19/003 |

| | | | | | |
|---|---|---|---|---|---|
| 2012/0263154 | A1 * | 10/2012 | Blanchflower | ......... | G06T 11/60 |
| | | | | | 455/414.1 |
| 2017/0061693 | A1 * | 3/2017 | Kohler | ................... | G06T 19/006 |
| 2018/0329485 | A1 * | 11/2018 | Carothers | ............. | G06T 19/006 |
| 2019/0279417 | A1 * | 9/2019 | Castaneda | ............. | G06T 19/006 |
| 2020/0036816 | A1 * | 1/2020 | Babu J D | ............. | H04L 67/131 |

(Continued)

FOREIGN PATENT DOCUMENTS

| | | |
|---|---|---|
| WO | 2019067112 A1 | 4/2019 |
| WO | 2019089477 A1 | 5/2019 |

OTHER PUBLICATIONS

EP Application No. 22201143.9, Office Action mailed Mar. 17, 2025, 6 pages.

(Continued)

*Primary Examiner* — Ryan M Gray
(74) *Attorney, Agent, or Firm* — Gilliam IP PLLC

(57) ABSTRACT

A multi-viewer extended reality (XR) streaming method of streaming XR images between a plurality of XR application instances and a plurality of XR devices is described. The multi-viewer XR streaming method comprises the steps of streaming, by means of a first XR application instance of the plurality of XR application instances, first XR images to at least one XR device, wherein the first XR images correspond to virtual content viewed from a first spectator position;

determining a position of the at least one XR device relative to the first spectator position; and reprojecting, by means of the at least one XR device, the first XR images based on the determined position of the at least one XR device.

Further, an XR streaming system is described.

20 Claims, 3 Drawing Sheets

(56)                    References Cited

U.S. PATENT DOCUMENTS

| | | | |
|---|---|---|---|
| 2020/0244996 A1* | 7/2020 | Iyer ...................... | H04N 19/513 |
| 2020/0257112 A1* | 8/2020 | Lucas Barcias ... | H04N 21/4402 |
| 2021/0258555 A1* | 8/2021 | Leiby ................... | H04N 13/161 |
| 2021/0286179 A1* | 9/2021 | Miller, IV .............. | G06F 3/013 |
| 2021/0346811 A1 | 11/2021 | Khan et al. | |
| 2022/0345678 A1* | 10/2022 | Wilson ................. | G06T 19/003 |

OTHER PUBLICATIONS

EP Application No. 22201143.9, Extended European Search Report mailed Mar. 13, 2023, 10 pages.
Gudumasu, et al., "Adaptive Volumetric Video Streaming Platform", 2019 6th International Conference on Systems and Informatics (ICSAI), IEEE, Nov. 2, 2019, 5 pages.

\* cited by examiner

Fig. 1 first external computer device — 14

| 26 — XR application instance |
| ⋮ |
| 26 — XR application instance |
| 28 — communication circuit |
| 30 — user management circuit |

XR devices — 10, 12, 12

| 18 — projection surface |
| 20 — camera(s) |
| 22 — position sensor(s) |
| 24 — communication circuit |
| 25 — reprojection circuit | second external computer device — 16

| 26 — XR application instance |
| ⋮ |
| 26 — XR application instance |
| 28 — communication circuit |
| 30 — user management circuit |

Fig. 2 first external computer device — 14 second external computer device — 16

10, 20, 20, 12, 18

S1 — XR devices subscribe to at least one XR application instance

S2 — stream XR images to XR devices

S3 — determine positions of XR devices relative to spectator positions

S4 — reproject XR images based on relative positions

MULTI-VIEWER EXTENDED REALITY REPROJECTION

FIELD OF THE DISCLOSURE

Embodiments of the present disclosure generally relate to a multi-viewer extended reality (XR) streaming method of streaming XR images between a plurality of XR application instances and a plurality of XR devices. Embodiments of the present disclosure further relate to an XR streaming system.

BACKGROUND

In certain XR applications, XR images to be displayed on an XR device of a user are streamed from an XR application instance that is implemented in an external computer device to the XR device of the user.

The XR device receives and displays the XR image stream, i.e., the XR images associated with the XR image stream are displayed on a display of the at least one XR device.

The XR images are rendered by the XR application instance such that the corresponding virtual content is correctly displayed in the current field of view of the user, which depends on the position, i.e., the location and/or orientation of the XR device.

If a plurality of users having a plurality of different fields of view are present, a dedicated XR application instance is necessary for each user in order to guarantee that the virtual content is correctly displayed to each user. This requires considerable amount of computational resources, and thus is rather costly to implement if several hundred or even several thousand users are present.

Thus, there is a need for a multi-viewer XR streaming method and XR streaming system that are more cost-efficient.

SUMMARY

The following summary of the present disclosure is intended to introduce different concepts in a simplified form that are described in further detail in the detailed description provided below. This summary is neither intended to denote essential features of the present disclosure nor shall this summary be used as an aid in determining the scope of the claimed subject matter.

Embodiments of the present disclosure provide a multi-viewer extended reality (XR) streaming method of streaming XR images between a plurality of XR application instances and a plurality of XR devices. The multi-viewer XR streaming method comprises the steps of:

streaming, by means of a first XR application instance of the plurality of XR application instances, first XR images to at least one XR device, wherein the first XR images correspond to virtual content viewed from a first spectator position;

determining a position of the at least one XR device relative to the first spectator position; and reprojecting, by means of the at least one XR device, the first XR images based on the determined position of the at least one XR device.

As used herein, the term "XR device" is understood to denote an electronic device that is configured to display an extended reality (XR) image, i.e., an augmented reality (AR) image, a mixed reality (MR) image, and/or a virtual reality (VR) image.

For example, the at least one XR device may be a head-mounted display, e.g., an electronic wearable having the shape of glasses. However, it is to be understood that the at least one XR device may be established as any other XR-capable electronic device, e.g., as a smartphone or as a tablet.

Moreover, the term "XR image" is understood to denote at least one (partially) virtual image.

In the case of augmented reality or mixed reality, the XR image corresponds to at least one virtual image that is superimposed over reality.

For example, the at least one XR device may be a head-mounted display with a semi-transparent display, wherein the virtual image is displayed on the semi-transparent display, such that the user can directly see the environment through the semi-transparent display, but with the virtual image superimposed.

As another example, the at least one XR device may be a head-mounted display that is optically opaque. In this case, the head-mounted display may comprise at least one internal camera, particularly several internal cameras being configured to capture images of the environment of the head-mounted display. The real images captured by means of the internal camera are superimposed with the virtual image(s), and the resulting superposition of the real image(s) and the augmented reality image(s) is displayed on a display of the head-mounted display.

As another example, the at least one XR device may be a smartphone or a tablet, wherein an image captured by means of a camera of the at least one XR device is superimposed with the at least one virtual image, and the resulting image is displayed on a display of the at least one XR device.

In the case of virtual reality, the XR image corresponds to a virtual image being displayed on a display of the at least one XR device.

For example, the at least one XR device may be a head-mounted display that is optically opaque. The XR images, namely the VR images, may be displayed on a display of the head-mounted display.

Further, the term "XR application instance" is understood to denote suitable hardware, suitable software, or a combination of hardware and software that is configured to execute a certain XR application.

For example, the XR application may be an engineering application that is configured to generate XR images associated with a 3D model of an object, e.g., of a car, of an engine, or of any other object.

In a particular example, a car may be recognized in the at least one image captured by means of the at least one camera, and may be superimposed with a 3D model of the car.

However, it is to be understood that the XR application may be any other type of augmented reality, mixed reality, or virtual reality application, e.g., a game or a metaverse application such as a social hub that may have different accessible areas.

The term "multi-viewer" is understood to denote that the XR streaming method can be used to stream XR images to a plurality of users simultaneously, particularly such that the same virtual content is displayed to the plurality of users.

The multi-viewer XR streaming method according to the present disclosure is based on the idea of reducing the number of different XR image streams. Instead of each XR device receiving a dedicated XR image stream, a reduced number of XR image streams associated with a predefined number of spectator positions is provided.

Due to the reduced number of XR image streams, a reduced number of XR application instances can be provided, thereby reducing the necessary computational resources and the costs for generating the XR image streams significantly.

The at least one XR device reprojects the received first XR images based on its relative position to the first spectator position, thereby obtaining reprojected first XR images.

The reprojected first XR images correspond to the virtual content associated with the first XR images correctly displayed for the position of the at least one XR device.

In fact, any suitable reprojection technique, particularly any suitable reprojection technique known in the state of the art may be used by the at least one XR device.

The multi-viewer XR streaming method according to the present disclosure can be scaled to higher numbers of users in a particularly cost-efficient manner.

In fact, the multi-viewer XR streaming method can be applied to large events hosting hundreds or even thousands of users. Instead of hundreds or thousands of XR application instances being necessary, only a fraction is necessary, thereby reducing the costs significantly.

According to an aspect of the present disclosure, the first XR images are streamed to at least two XR devices (simultaneously), wherein the positions of the at least two XR devices relative to the first spectator position are determined, and wherein the first XR images are reprojected based on the respective positions determined. In other words, the at least two XR devices each receive the first XR images. The XR devices each reproject the received first XR images, wherein the reprojected XR images obtained by the at least two XR devices are different from each other due to the different positions of the at least two XR devices relative to the first spectator position. As a result, the corresponding virtual content is correctly displayed on the at least two XR devices.

In an embodiment of the present disclosure, the multi-viewer XR streaming method further comprises the steps of:

streaming, by means of a second XR application instance of the plurality of XR application instances, second XR images to at least one further XR device, wherein the second XR images correspond to virtual content viewed from a second spectator position, wherein the second spectator position is different from the first spectator position;

determining a position of the at least one further XR device relative to the second spectator position; and reprojecting, by means of the at least one further XR device, the second XR images based on the determined position of the at least one further XR device.

In other words, different XR devices may subscribe to different XR application instances, such that each XR device receives the XR images best suited for its current position. Thus, the reprojection can be performed by means of the XR devices with enhanced accuracy.

Of course, further XR application instances streaming further XR images associated with further spectator positions may be provided.

According to another aspect of the present disclosure, the plurality of XR application instances executes the same XR application. Accordingly, the XR images streamed by different XR application instances relate to the same virtual content, but viewed from different positions, namely from different spectator positions associated with the different XR application instances.

In a further embodiment of the present disclosure, the plurality of XR application instances is synchronized. Accordingly, the XR application instances may generate the XR images in a synchronized manner, such that the same virtual content is displayed to different users of different XR devices simultaneously.

Particularly, the XR application instances are associated with one spectator position. Accordingly, there may be a one-to-one correspondence between XR application instances and spectator positions, such that each XR application instance generates XR images for one spectator position. Thus, the computational resources necessary to generate different XR image streams associated with different spectator positions is reduced to a minimum, namely to one XR application instance per spectator position.

According to an aspect of the present disclosure, the plurality of XR devices each receive XR images that are streamed by the XR application instance associated with the spectator position that is closest to the respective XR device. In other words, each XR device may subscribe to the XR application instance associated with the spectator position that is closest to the respective XR device. Accordingly, the distance between the XR device and the associated spectator position is kept at a minimum, which may result in an enhanced quality of the reprojections performed by the XR devices.

According to a further aspect of the present disclosure, a plurality of spectator positions is provided, particularly wherein the plurality of spectator positions is arranged in a predefined pattern. While increasing the number of spectator positions increases the necessary computational resources, increasing the number of spectator positions additionally enhances the quality of the reprojection performed by the XR devices, as the XR devices can (typically) subscribe to an XR application instance being associated with a closer spectator position.

Accordingly, the spectator positions may be arranged such that the average distance of the XR devices to the closest spectator position is minimized.

The predefined pattern may depend on the number of available XR application instances, the number of XR devices that are to be supported, a layout of an environment of the XR devices, a location where the virtual content is to be displayed, etc.

For example, if the environment of the XR devices is an elliptical stadium, and the virtual content is to be displayed in the middle of the stadium, the predefined pattern may be approximately elliptical.

As another example, if the environment of the XR devices is a theatre, and the virtual content is to be displayed on a stage in a front area of the theatre, the spectator positions may be uniformly distributed over an audience area of the theatre.

Another aspect of the present disclosure provides that at least one of the XR devices receives XR images from at least two XR application instances. In other words, the at least one XR device may subscribe to more than one XR application instance at a time, e.g., to the two XR application instances being associated with the two closest spectator positions. Thus, a backup stream is provided to the XR device in case the connection to one of the at least two XR application instances is lost, the XR image stream generated by one of the at least two XR application instances is corrupted, and/or the XR device moves by a certain distance such that a switching between the XR application instances is necessary.

In other words, the at least one of the XR devices may receive the first XR images from the first XR application instance, wherein the first XR images correspond to virtual content viewed from the first spectator position. The at least one of the XR devices may further receive second XR images from a second XR application instance, wherein the second XR images correspond to virtual content viewed from a second spectator position. The at least one the XR devices may switch between the first XR images and the second XR images if necessary, as described above.

Further, it is conceivable that the at least one of the XR devices may reproject and/or augment the first XR images based on the second XR images. The second XR images comprise information about the virtual content viewed from another spectator position, namely from the second spectator position. This additional information may be used by the at least one of the XR devices in order to reproject the first XR images and/or in order to augment the first XR images, such that the virtual content is correctly displayed for the actual position of the at least one of the XR devices.

For example, certain portions of the virtual content may not be visible from the first spectator position, as the corresponding portions are concealed by another virtual object. However, these portions may be visible from the actual position of the at least one of the XR devices. The additional information comprised in the second XR images, which show the virtual content from the second spectator position, may be used by the at least one of the XR devices to add the missing portions of the virtual content to the first XR images.

According to an aspect of the present disclosure, the first spectator position is a predefined world position. As used herein, the term "world position" is understood denote a position in a coordinate space having its origin in the environment of the at least one XR device. This coordinate space may also be called "world space". Thus, the first spectator position (and further spectator positions) may be defined with respect to the environment of the at least one XR device.

The first spectator position may be determined based on world positions of a subset of the plurality of XR devices, particularly wherein the first spectator position corresponds to an average of the world positions of the subset of the plurality of XR devices. In other words, the first spectator position may be determined based on the world positions of XR devices that are subscribed to the associated XR application instance, particularly such that the average distance of the XR devices to the first spectator position is minimized. Thus, an enhanced quality of the reprojections performed by the XR devices may be obtained.

In an embodiment of the present disclosure, XR image data associated with the XR images comprises information on a view matrix and/or a projection matrix, particularly wherein the view matrix and/or the projection matrix is associated with a respective spectator position. In general, the XR images to be displayed may comprise virtual, world-anchored objects, particularly virtual 3D objects. Accordingly, these objects may be defined in a fixed coordinate space having its origin in the environment of the at least one XR device, i.e., in the world space.

The view matrix comprises all information necessary in order to transform objects from the world space to the view space, wherein the view space is associated with the respective spectator position, particularly with at least one (virtual) camera located at the respective spectator position. In the view space, the at least one (virtual) camera may rest at the origin, particularly wherein the main view direction of the at least one (virtual) camera is along the z-axis.

In other words, the view matrix comprises all information necessary in order to transform the virtual objects, particularly the virtual 3D objects, such that these objects can be correctly displayed at the respective spectator position.

The projection matrix comprises all information necessary in order to project objects from the view space into the projection space, wherein the projection space is associated with the at least one (virtual) camera at the respective spectator position. In general, this projection of objects into the projection space allows to correctly display virtual (3D) objects on the at least one XR device.

Embodiments of the present disclosure further provide an extended reality (XR) streaming system. The XR streaming system comprises a plurality of XR application instances and a plurality of XR devices. The plurality of XR application instances is connectable with the plurality of XR devices. The XR streaming system is configured to perform the multi-viewer XR streaming method according to any one of the variants described above.

Regarding the advantages and further properties of the XR streaming system, reference is made to the explanations given above with respect to the multi-viewer XR streaming method described above, which also hold for the XR streaming system.

According to an aspect of the present disclosure, the plurality of XR application instances is implemented on a single server. Alternatively, the XR streaming system comprises a plurality of servers, wherein the plurality of XR application instances is implemented on the plurality of servers.

The different servers may be interconnected with each other, e.g., via a wide area network (WAN) or via the internet.

According to another aspect of the present disclosure, the XR streaming system comprises a user management circuit, wherein the user management circuit is configured to allocate at least one of the plurality of XR application instances to the XR devices, respectively. In other words, the user management circuit may be configured to control which XR application instances the individual XR devices can subscribe to. Alternatively or additionally, the user management circuit may be configured to control the XR streaming system such that each XR device is automatically subscribed to the XR application instance being associated with the closest spectator position.

As used herein, the term "circuit" is understood to denote hardware or a combination of hardware and software that is configured to perform a certain functionality.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 1 schematically shows a block diagram of an XR streaming system according to the present disclosure;

FIG. 2 schematically shows an exemplary embodiment of the XR streaming system of FIG. 1;

DETAILED DESCRIPTION

Figure 3:
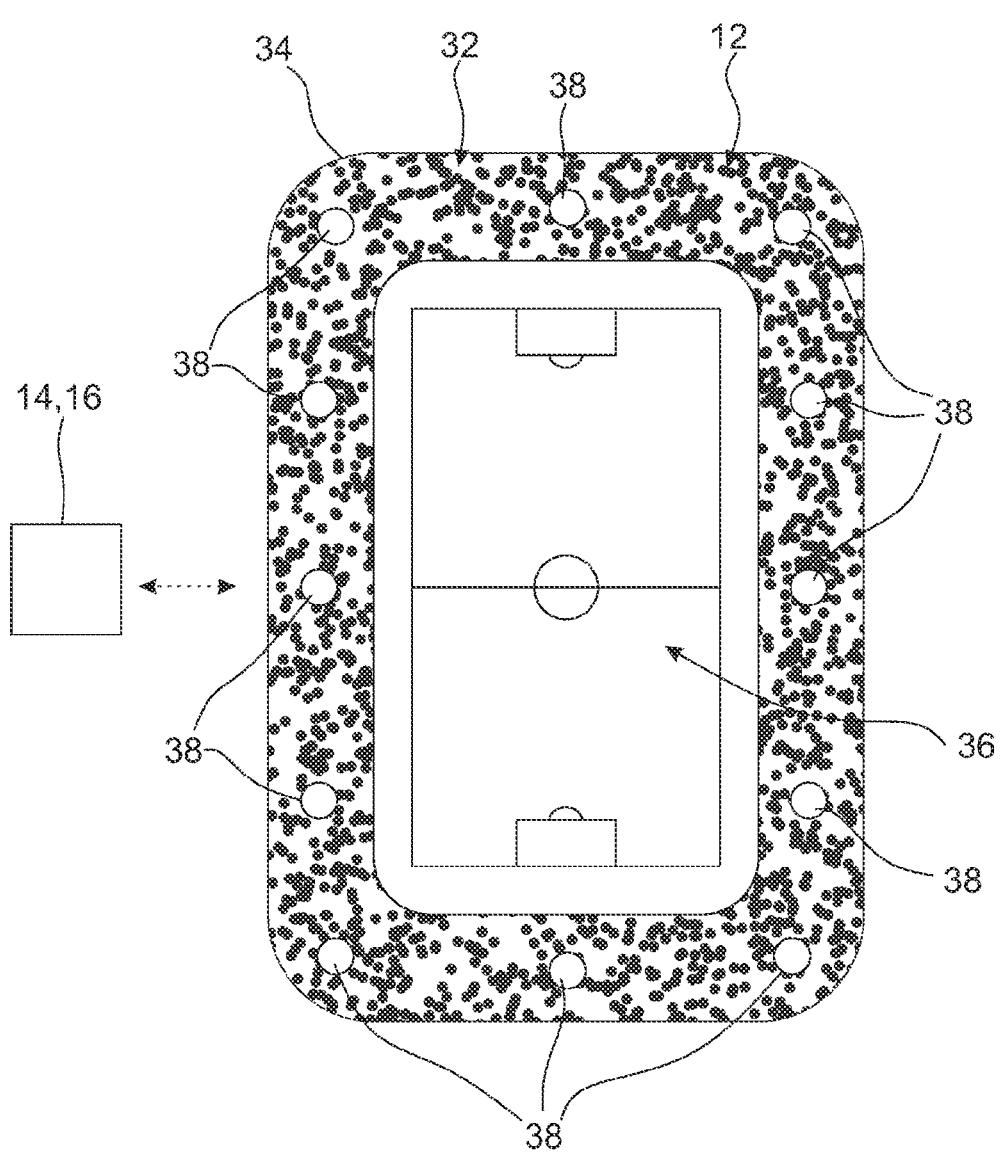
FIG. 3 schematically shows an exemplary use case of the XR streaming system of FIG. 1.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

For the purposes of the present disclosure, the phrase "at least one of A, B, and C", for example, means (A), (B), (C), (A and B), (A and C), (B and C), or (A, B, and C), including all further possible permutations when more than three elements are listed. In other words, the term "at least one of A and B" generally means "A and/or B", namely "A" alone, "B" alone or "A and B".

FIG. 1 schematically shows a block diagram of an XR streaming system 10 comprising a plurality of XR devices 12 and a first external computer device 14.

The plurality of XR devices 12 may be identically constructed or may be constructed differently from each other. Without restriction of generality, it is assumed in the following that the XR devices 12 are identically constructed. Accordingly, a single XR device 12 is described in the following, and the explanations likewise apply to the other XR devices 12.

As is indicated by the dashed arrow, the first external computer device 14 is connected with the XR device 12 in a signal-transmitting manner.

Optionally, the XR streaming system 10 further comprises a second external computer device 16. The second external computer device 16 is connectable with the XR device 12 in a signal-transmitting manner.

As used herein, the terms "connectable", "connected", and "connected in a signal transmitting manner" are understood to denote a cable-based or wireless connection that is configured to transmit signals between the respective devices or components.

In general, the XR device 12 is an electronic device that is configured to display an extended reality (XR) image, i.e., an augmented reality (AR) image, a mixed reality (MR) image, and/or a virtual reality (VR) image.

As is illustrated in FIG. 2, the XR device 12 may, for example, be configured as a head-mounted display, particularly as an electronic wearable having the shape of glasses.

However, it is to be understood that the XR device 12 may be established as any other XR-capable electronic device, e.g., as a smartphone or as a tablet.

In general, the XR streaming system 10 allows a user to observe and/or interact with virtual objects, particularly virtual 3D objects, that are streamed from at least one of the external computer devices 14, 16 to the XR device 12.

If the XR streaming system 10 is an AR streaming system or an MR streaming system, these virtual objects are embedded into a real environment of the user.

Accordingly, the XR device 12 comprises at least one projection surface 18, wherein an XR image to be displayed is projected onto the projection surface 18, such that the virtual object is displayed to the user.

The projection surface 18 may be a display of the XR device 12.

Optionally, the XR streaming system 10 may comprise at least one handheld input device (not shown in FIG. 1), wherein the user may control the XR streaming system 10 by means of the at least one handheld input device.

For example, the at least one handheld input device may be established as a pen-shaped device, as a gamepad, or as any other type of suitable input device.

The XR device 12 further comprises at least one camera 20, at least one position sensor 22, a communication circuit 24, and a reprojection circuit 25.

The at least one camera 20 is configured to capture images of an environment of the XR device 12, particularly of an environment in front of the XR device 12.

Particularly, the at least one camera 20 may be established as a stereo camera. Alternatively or additionally, the XR device 12 may comprise several cameras with overlapping field of view. Thus, depth-information on images taken by the at least one camera 20 can be determined based on images taken by the at least one camera 20.

The at least one camera 20 may be operable in the visible light spectrum and/or in the infrared spectrum. For example, the XR device 12 may comprise at least one camera 20 being operable in the visible light spectrum, and at least one camera 20 being operable in the infrared spectrum.

The at least one position sensor 22 is configured to determine a position, i.e., a location and/or orientation of the XR device 12.

For example, the at least one position sensor 22 may be established as a gyroscope, as an acceleration sensor, as a magnetometer, as a global navigation satellite system (GNSS) device, and/or as any other suitable type of position sensor.

The XR device 12 may stream the determined position to the external computer devices 14, 16, such that an XR application or a plurality of XR applications running on the external computer devices 14, 16 may take the determined position of the XR device 12 into account.

In general, the first external computer device 14 and the second external computer device 16 may each be established as any type of electronic computing device that is configured to have the functionality described herein.

For example, the external computer devices 14, 16 may be established as a personal computer, as a laptop, as a notebook, as a Mac® computer, as a tablet, as a smartphone, or as any other type of smart device, respectively.

Preferably, the external computer devices 14, 16 are established as a server.

Without restriction of generality, it is assumed in the following that the external computer devices 14, 16 are established as a server.

The external computer devices 14, 16 may be interconnected with each other, e.g., via a wide area network (WAN) or via the Internet.

The external computer devices 14, 16 each comprise a plurality of XR application instances 26, a communication circuit 28, and a user management circuit 30.

In fact, an arbitrary number of external computer devices may be provided, each computer device comprising an arbitrary number of XR application instances 26.

As used herein, the term "XR application instance" is understood to denote suitable hardware, suitable software, or a combination of hardware and software that is configured to execute a certain XR application.

The communication circuit 24 of the XR device 12 and the communication circuits 24, 28 of the external computer devices 14, 16 are configured to communicate with each other.

In fact, image data, sensor data, position data and/or control data may be exchanged between the XR device 12 and the external computer devices 14, 16 by means of the communication circuits 24, 28.

Any suitable wireless or cable-based transmission technique may be used by the communication circuits 24, 28, e.g., wireless local-area network (WLAN), 4G, 5G, Ethernet, etc.

In general, the XR application executed by the XR application instances 26 may be any type of augmented reality, mixed reality, or virtual reality application, e.g., an engineering application, a game, or a metaverse application.

As will be described in more detail below, the XR application instances 26 are configured to execute the same XR application and generate corresponding XR image streams, such that multiple users can view the same virtual content simultaneously and at the same position within the world space.

Particularly, the XR application instances 26 are synchronized, such that the virtual content is displayed to the users in a synchronized manner.

An exemplary use case of the XR streaming system 10 is illustrated in FIG. 3, wherein a plurality of users (indicated by the small dots), each having an XR device 12, is located in the stands 32 of a stadium 34.

The external computer devices 14, 16 may be provided within the stadium 34 or at another location.

In this example, the XR application executed by the XR application instances 26 may be configured to display additional information on players on the field 36 of the stadium 34, such as statistics or player names. The additional information may be displayed directly above the corresponding player.

As another example, the XR application may be configured to display an XR replay of previous game situations, wherein the replay is displayed directly on the field 36.

As another example, a game or a concert taking place in another stadium may be displayed to the users in the stadium 34.

Of course, other environments and/or other XR applications are possible as well.

Figure 4:
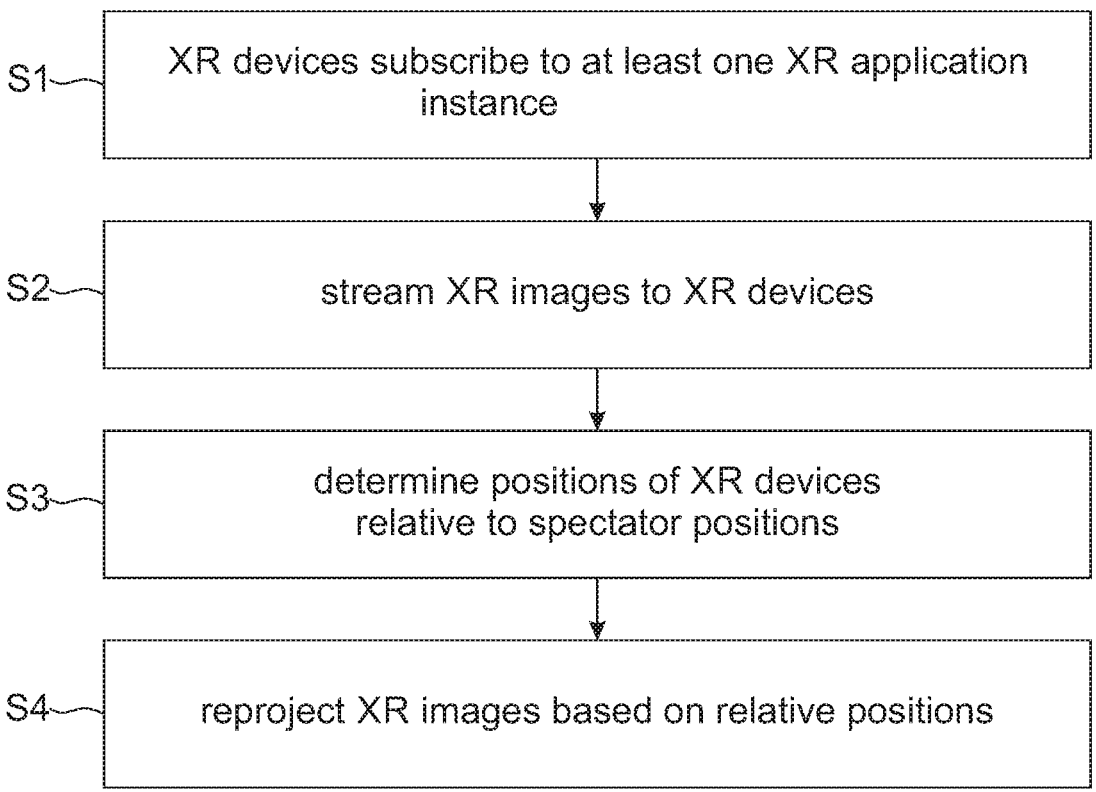
FIG. 4 shows a flow chart of a multi-viewer XR streaming method according to the present disclosure.

The XR streaming system 10 is configured to perform a multi-viewer XR streaming method for streaming XR images between the plurality of XR application instances 26 and the plurality of XR devices 12, which is described in the following with reference to FIG. 4.

The XR devices 12 subscribe to at least one of the XR application instances 26 (step S1).

As is illustrated in FIG. 3, a plurality of spectator positions 38 is provided in the environment of the XR devices 12, wherein each spectator position 38 is a predefined world position in the environment of the XR devices 12.

In general, the spectator positions 38 are arranged in a certain pattern, such that an average distance of the XR devices 12 to the closest spectator position 38 is minimized.

The spectator positions 38 may be fixed, i.e., the spectator positions 38 may be provided irrespective of world positions of the XR devices 12.

In the particular example shown in FIG. 3, the spectator positions 38 are arranged approximately equidistant around the stands 32 of the stadium 34.

Alternatively, the spectator position 38 may be determined based on the world positions of the XR devices 12, such that an average distance of the XR devices 12 to the closest spectator position 38 is minimized.

For this purpose, the XR devices 12 may determine their world positions by means of the at least one position sensor 22, and the determined world positions may be forwarded to the external computer devices 14, 16.

For example, world positions of XR devices 12 that are located in a certain region of the environment may be averaged in order to determine the respective spectator position 38.

Each of the XR application instances 26 may be associated with exactly one of the spectator positions 38.

Accordingly, each XR device 12 may subscribe to the XR application instance 26 that is associated with the spectator position 38 that is closest to the respective XR device 12.

Optionally, the XR devices 12 may subscribe to more than one XR application instance 26, for example to the two XR application instances 26 being associated with the two closest spectator positions 38. A backup is provided if transmissions from one of the application instances 26 fail, and transition between different XR application instances is facilitated if the user moves too far from a certain spectator position 38.

Step S1 may be controlled by means of the user management circuit 30.

In fact, the user management circuit 30 may control XR application instances 26 to which the individual XR devices 12 can subscribe.

Alternatively or additionally, the user management circuit 30 may control the XR streaming system 10 such that each XR device 12 is automatically subscribed to the XR application instance 26 being associated with the closest spectator position 38.

XR image streams are generated by the XR application instances 26 and are streamed to the XR devices (step S2).

Each XR image stream comprises XR images that correspond to virtual content viewed from the respective spectator position 38 associated with the XR application instance generating the XR image stream.

For example, the XR image streams or rather the XR image data comprised in the XR image streams may comprise information on a view matrix that is associated with the respective spectator position 38.

Alternatively or additionally, the XR image streams or rather the XR image data comprised in the XR image streams may comprise information on a projection matrix that is associated with the respective spectator position 38.

Positions of the XR devices 12 relative to the associated spectator positions 38 are determined (step S3).

For example, the XR devices 12 may determine their world positions by means of the at least one position sensor 22, and the XR application instances 26 may transmit the world positions of the spectator positions 38 to the XR devices 12, such that the XR devices 12 can determine their relative positions to the spectator positions 38 based on their world positions and the transmitted spectator positions 38.

However, any other suitable method of determining the relative position may be used.

For example, spatial anchors such as optical codes or predetermined objects may be provided in the environment of the XR devices 12. The world position or the relative position may be determined based on images of the spatial anchors captured by means of the at least one camera 20 of the XR devices 12.

The XR images received from the XR application instances 26 are reprojected based on the relative positions to the spectator positions 38 (step S4).

More precisely, each XR device 12 reprojects the received XR images by means of the reprojection circuit 25 based on the relative position to the associated spectator position 38.

The resulting reprojected XR images correspond to the virtual content associated with the XR images received from the XR application instances 26, but correctly displayed for the position of the respective XR device 12.

The XR streaming system 10 described above is highly scalable. In fact, the XR streaming system 10 can support large events hosting hundreds or even thousands of users. Instead of hundreds or thousands of XR application instances 26 being necessary, only a small number of XR application instances are necessary, thereby reducing the costs of the XR streaming system 10 significantly.

Certain embodiments disclosed herein, particularly the respective module(s) and/or unit(s), utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about", "approximately", "near" etc., mean plus or minus 5% of the stated value.

The invention claimed is:

1. A method of streaming extended reality (XR) images between a plurality of XR application instances and a plurality of XR devices, wherein the method comprises:
   streaming, by a first XR application instance of the plurality of XR application instances, first XR images to a plurality of XR devices in a first subset of the plurality of XR devices, wherein the first XR images correspond to virtual content viewed from a first spectator position, wherein the first spectator position is determined based on an average of world positions of the plurality of XR devices in the first subset that are subscribed to the first XR application instance, wherein the first subset of the plurality of XR devices comprises at least two XR devices;

determining a position for each XR device of the first subset relative to the first spectator position; and reprojecting, with XR devices of the first subset, the first XR images based on the corresponding positions of the XR devices of the first subset relative to the first spectator position to generate reprojected XR images.

2. The method of claim 1, further comprising:
   streaming, by a second XR application instance of the plurality of XR application instances, second XR images to a second subset of XR devices of the plurality of XR devices, wherein the second XR images correspond to virtual content viewed from a second spectator position, wherein the second spectator position is different from the first spectator position;
   determining a second position of the second subset of XR devices relative to the second spectator position; and
   reprojecting, with the second subset of XR devices, the second XR images based on the position of XR devices of the second subset.

3. The method of claim 1, wherein the plurality of XR application instances executes a same XR application.

4. The method of claim 1, wherein the plurality of XR application instances is synchronized.

5. The method of claim 1, wherein each of the plurality of XR application instances are associated with a single spectator position.

6. The method of claim 5, wherein an additional XR device receives a stream of images for reprojection from an XR application instance hosting a closest spectator position to the additional XR device.

7. The method of claim 1, wherein a plurality of spectator positions including the first spectator position is arranged in a predefined pattern.

8. The method of claim 1, wherein at least one of the plurality of XR devices receives XR images from at least two XR application instances.

9. The method of claim 1, wherein the first XR images further comprise image data associated with the first XR images, wherein the image data comprises information of at least one of a view matrix and a projection matrix.

10. The method of claim 9, wherein at least one of the view matrix and the projection matrix are associated with a corresponding spectator position.

11. A system, comprising:
   a server hosting a plurality of XR application instances connected to a plurality of XR devices, wherein the server is configured to stream, by a first XR application instance of the plurality of XR application instances, first XR images to a first subset of the plurality of XR devices, wherein the first XR images are rendered to display virtual content viewed from a first spectator position, wherein the first spectator position is determined based on an average of world positions of a plurality of XR devices in the first subset that are subscribed to the first XR application instance, wherein the first subset of the plurality of XR devices comprises at least two XR devices; and
   a first XR device of the plurality of XR devices in the first subset that is configured to, determine a position of the first XR device relative to the first spectator position; and
   reproject the first XR images based on the corresponding position of the first XR device relative to the first spectator position to generate reprojected XR images.

12. The system of claim 11, further comprising a plurality of servers, wherein one or more XR application instances of the plurality of XR application instances are implemented on each of the plurality of servers, wherein the plurality of servers includes the server.

13. The system of claim 11, wherein the server comprises a user management circuit that is configured to allocate at least one of the plurality of XR application instances to each of the plurality of XR devices.

14. A non-transitory machine-readable medium having program code stored thereon, the program code comprising instructions to:

stream, by a first XR application instance of a plurality of XR application instances, first XR images to a plurality of XR devices in a first subset of a plurality of XR devices, wherein the first XR images correspond to virtual content viewed from a first spectator position, wherein the first spectator position is determined based on an average of world positions of the plurality of XR devices in the first subset that are subscribed to the first XR application instance, wherein the first subset of the plurality of XR devices comprises at least two XR devices;

determine a position for each XR device of the first subset relative to the first spectator position; and reproject, with XR devices of the first subset, the first XR images based on the corresponding position of each XR device of the first subset relative to the first spectator position to generate reprojected XR images.

15. The method of claim 1, further comprising determining a plurality of spectator positions including the first spectator position so that an average distance of the XR devices subscribed to respective XR application instances of the plurality of XR application instances is minimized.

16. The system of claim 11, wherein the plurality of XR application instances hosted on the server execute a same XR application.

17. The system of claim 11, wherein the plurality of XR application instances hosted on the server are each associated with a single spectator position.

18. The system of claim 11, wherein the server is configured to stream to each XR device of the plurality of XR devices a stream of images for reprojection from an XR application instance corresponding to a closest spectator position to the XR device.

19. The system of claim 11, wherein at least one XR device of the plurality of XR devices receives XR images from at least two XR application instances.

20. The system of claim 11, wherein the server is configured to stream XR image data associated with the first XR images to the plurality of XR devices, wherein the XR image data comprises information for at least one of a view matrix and a projection matrix.

* * * * *